US011762532B2

(12) United States Patent
Toyohara

(10) Patent No.: US 11,762,532 B2
(45) Date of Patent: Sep. 19, 2023

(54) IMAGE PROCESSING DEVICE, CONTROL METHOD THEREFOR, IMAGING DEVICE, AND RECORDING MEDIUM

(71) Applicant: CANON KABUSHIKI KAISHA, Tokyo (JP)

(72) Inventor: Yohei Toyohara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/532,769

(22) Filed: Nov. 22, 2021

(65) Prior Publication Data

US 2022/0164072 A1 May 26, 2022

(30) Foreign Application Priority Data

Nov. 26, 2020 (JP) ................................ 2020-195762

(51) Int. Cl.
| | |
|---|---|
| *G06T 3/40* | (2006.01) |
| *G06F 3/0482* | (2013.01) |
| *G06T 7/70* | (2017.01) |
| *G06F 3/04845* | (2022.01) |

(52) U.S. Cl.
CPC ........ *G06F 3/0482* (2013.01); *G06F 3/04845* (2013.01); *G06T 3/40* (2013.01); *G06T 7/70* (2017.01)

(58) Field of Classification Search
CPC ..... G06F 3/0482; G06F 3/04845; G06T 7/70; G06T 3/40
See application file for complete search history.

(56) References Cited

U.S. PATENT DOCUMENTS

| | | | | |
|---|---|---|---|---|
| 9,204,781 | B2* | 12/2015 | Taniguchi | A61B 1/041 |
| 10,354,691 | B2* | 7/2019 | Kunishige | H04N 5/76 |
| 2005/0220346 | A1* | 10/2005 | Akahori | G06T 7/11 |
| | | | | 382/167 |
| 2007/0223830 | A1* | 9/2007 | Ono | G06V 40/168 |
| | | | | 382/254 |
| 2013/0129234 | A1* | 5/2013 | Farid | G06T 7/337 |
| | | | | 382/228 |
| 2017/0034449 | A1* | 2/2017 | Eum | H04N 23/635 |
| 2017/0154453 | A1* | 6/2017 | Yasutomi | G06T 11/60 |
| 2019/0348043 | A1* | 11/2019 | Saito | G10L 13/00 |
| 2020/0280669 | A1* | 9/2020 | Kawaguchi | H04N 23/743 |

FOREIGN PATENT DOCUMENTS

JP 2019-121914 A 7/2019

* cited by examiner

*Primary Examiner* — Andrea C Leggett
(74) *Attorney, Agent, or Firm* — Cowan, Liebowitz & Latman, P.C.

(57) ABSTRACT

An imaging device includes a display unit configured to display captured images in a list and an image processing unit configured to edit an image selected out of a plurality of images displayed in the list through a predetermined retouch process. A photographing image is acquired and an automatically retouched image is acquired. The imaging device calculates a retouch score as an evaluation value and performs retouch simulation on an image of which the retouch score is equal to or greater than a threshold value. The image processing unit generates thumbnail images based on images before and after the editing of an image, and the display unit displays the list using the generated thumbnail images.

12 Claims, 11 Drawing Sheets

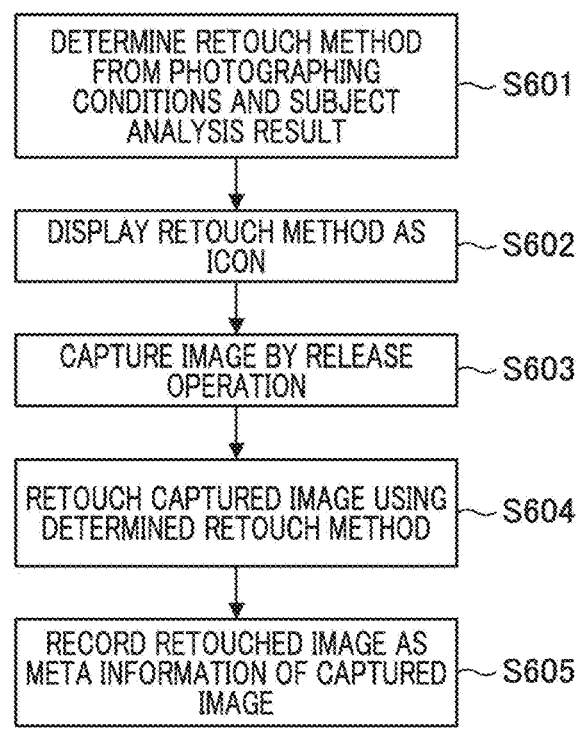

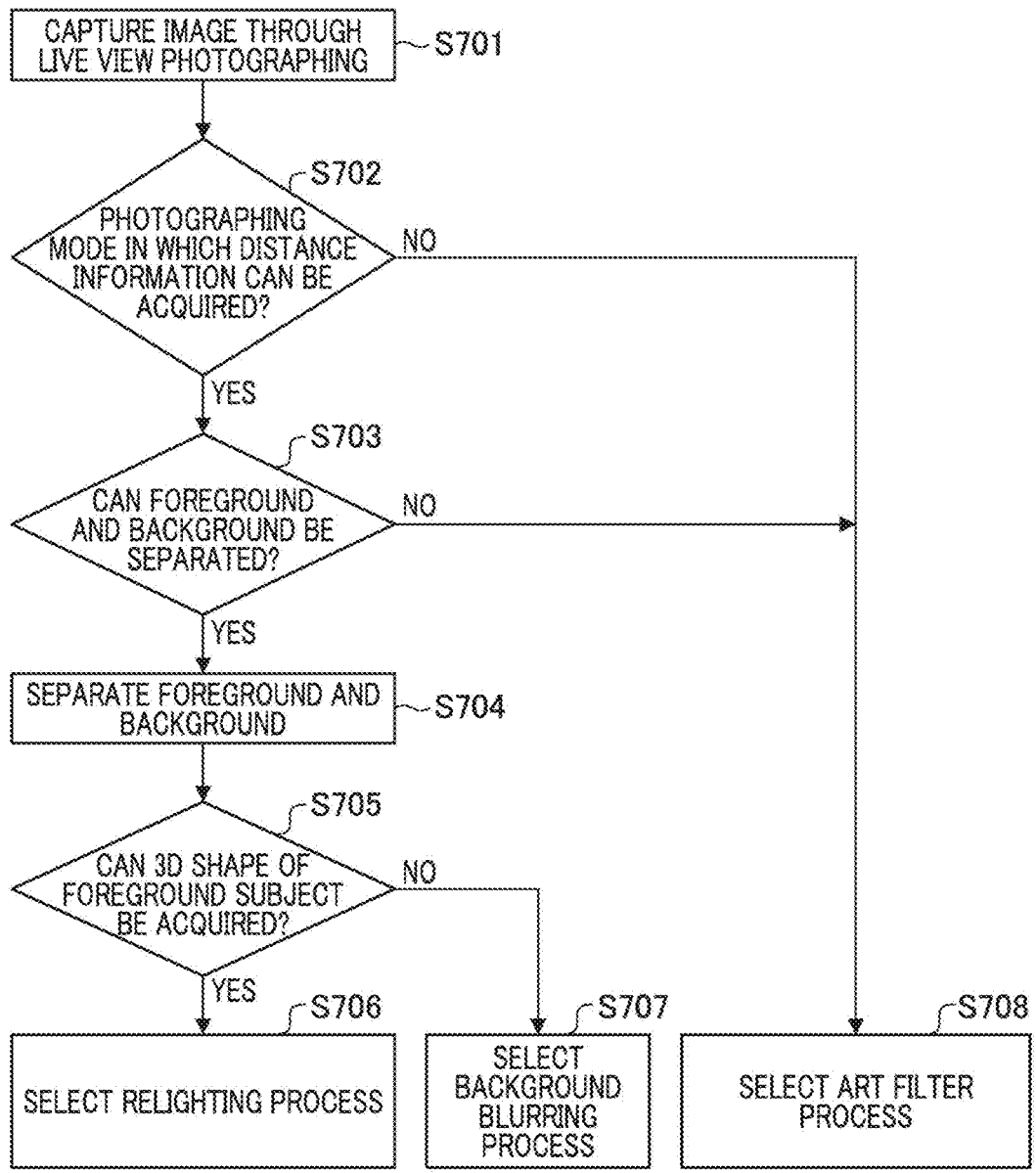

IMAGE PROCESSING DEVICE, CONTROL METHOD THEREFOR, IMAGING DEVICE, AND RECORDING MEDIUM

BACKGROUND OF THE INVENTION

Field of the Invention

The present invention relates to an image list displaying process in an imaging device or the like.

Description of the Related Art

Recently, users have been able to enjoy various photographic expressions by performing a retouch on taken photographs (photo retouch). At this time, it is troublesome to find a retouch suitable for each taken photograph through trial and error. Japanese Patent Laid-Open No. 2019-121914 discloses an image processing device and an image processing method that can select special image processing of which an effect can be easily sensed by a user and which can be easily used by a user. By arranging and displaying images with retouch effects performed thereon at the time of photographing, a user can take a photograph while ascertaining retouched images.

In the method described in Japanese Patent Laid-Open No. 2019-121914, when trying retouches on all captured images for a user to ascertain effects of the retouches at the time of photographing takes a long time, much time is required for the imaging operation. A user has to pay attention to the imaging and there is a chance that the way that an image changes with a retouch will be intuitively unclear.

SUMMARY OF THE INVENTION

The present invention provides an image processing device in which image processing effects of a plurality of images which are displayed in a list can be easily ascertained.

According to an embodiment of the present invention, there is provided an image processing device including at least one processor and at least one memory holding a program that makes the processor function as: a selection unit configured to select an image out of a plurality of images displayed in a list; a generation unit configured to generate a second image by performing image processing on a first image selected by the selection unit and to generate a third image used for displaying a list as an image changing with time out of the first and second images; a control unit configured to control the generation unit; and an output unit configured to output the third image.

Further features of the present invention will become apparent from the following description of exemplary embodiments with reference to the attached drawings.

BRIEF DESCRIPTION OF THE DRAWINGS

FIG. 6 is a flowchart illustrating a process routine of performing automatic retouch simulation at the time of photographing.

FIG. 7 is a flowchart illustrating a process routine of automatically selecting a retouch method.

DESCRIPTION OF THE EMBODIMENTS

Hereinafter, an exemplary embodiment of the present invention will be described in detail with reference to the accompanying drawings. In this embodiment, it is assumed that an image processing device according to the present invention is applied to an imaging device such as a smartphone. For example, an imaging device includes a list display application and can display a list of images.

Figure 1:
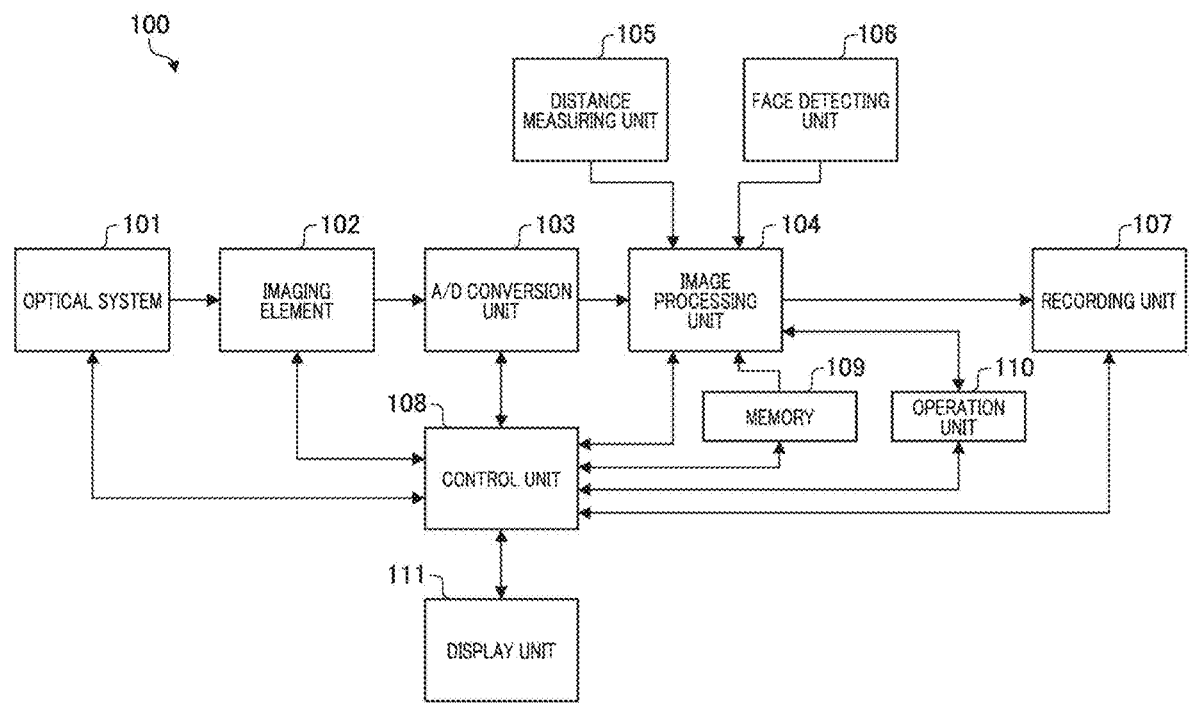
FIG. 1 is a block diagram illustrating an example of a configuration of an imaging device according to an embodiment.

FIG. 1 is a block diagram illustrating a configuration of an imaging device 100 according to an embodiment. An optical system 101 is an imaging optical system including optical members such as a focusing lens, an aperture, and a shutter. In the optical system 101, focusing of a subject is performed by driving the focusing lens at the time of photographing and an exposure value is adjusted by controlling the aperture or the shutter.

An imaging element 102 performs photoelectric conversion on a subject image formed by the optical system 101 and outputs an electrical signal. The imaging element 102 includes photoelectric conversion elements using a charge-coupled device (CCD) or a complementary metal-oxide semiconductor (CMOS). An A/D conversion unit 103 performs a process of converting an analog electrical signal input from the imaging element 102 to a digital signal. The digital image signal is output to an image processing unit 104.

The image processing unit 104 performs a synchronization process, a white balance correction process, a gamma process, a retouching process, and the like on the image signal acquired from the A/D conversion unit 103 and outputs the processed image signal to a recording unit 107.

A distance measuring unit 105 acquires information on a distance to a subject (subject distance information) at the time of photographing and generates distance map data. The distance map data is data of a two-dimensional arrangement indicating subject distance information in units of pixels in a captured image. The distance map data is output to the image processing unit 104.

A face detecting unit 106 detects a face area of a person who is a subject in a captured image. Face detection is performed to determine a subject area in a retouch process which is performed by the image processing unit 104. For example, coordinate values of facial organs such as the right eye, the left eye, and the mouth of the subject are detected and distances between the facial organs (such as the distance between the right eye and the left eye) are calculated. A process of setting an elliptical area centered on the central coordinates of each organ based on the distances between the facial organs such that a background area is not included therein and detecting the elliptical area as a face area is performed. Information of the face detection result is output to the image processing unit 104.

The recording unit 107 performs a process of acquiring the image signal output from the image processing unit 104, converting the acquired image signal to data in an image format such as Joint Photographic Experts Group (JPEG), and recording the data on a recording medium. For example, the recording medium is a memory that is attachable to and detachable from the imaging device 100.

A control unit 108 includes a central processing unit (CPU) and controls the operation of the imaging device as a whole. For example, the control unit 108 calculates a target exposure value in the optical system 101 based on brightness information of a subject detected immediately before photographing. The control unit 108 calculates a predetermined evaluation value based on the captured image and determines parameters of image processing which is performed by the image processing unit 104. A memory 109 stores information used for the image processing unit 104 and information such as settings or lighting conditions at the time of photographing and outputs data stored therein to the image processing unit 104 according to necessity.

An operation unit 110 includes an operation member or an operation device that is used for a user to instruct the imaging device to perform an operation. A display unit 111 includes, for example, a liquid crystal display with a touch panel mounted thereon. The display unit 111 displays a screen for assisting with an operation at the time of photographing or displays an image such as image data stored in the recording unit 107.

Figure 2A:
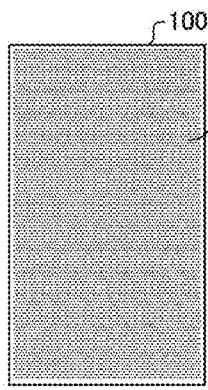
FIGS. 2A to 2D are diagrams schematically illustrating display of a list of images.
Figure 2B:
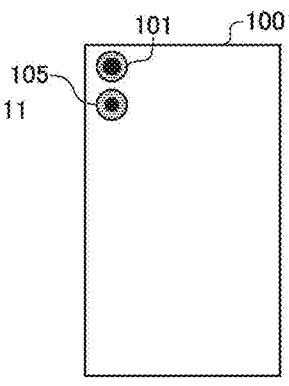
Figure 2C:
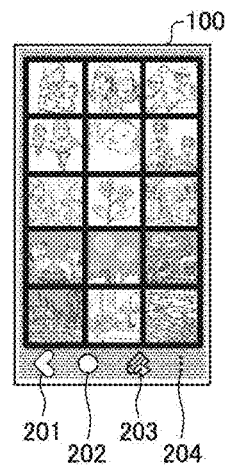
Figure 2D:
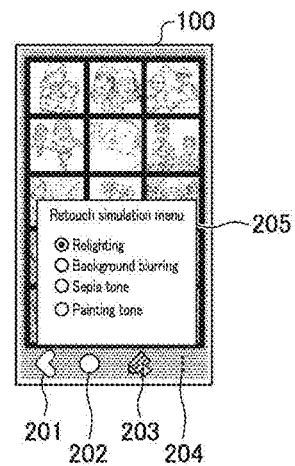

FIGS. 2A to 2D are diagrams schematically illustrating an example of an appearance of the imaging device 100. FIG. 2A is a diagram illustrating a surface of the imaging device 100 on which the display unit 111 is provided. FIG. 2B is a diagram illustrating a rear surface of the surface illustrated in FIG. 2A. FIG. 2C is a diagram illustrating a display example using a list display application. FIG. 2D is a diagram illustrating a state in which a retouch simulation menu is started.

The display unit 111 illustrated in FIG. 2A includes a liquid crystal display with a touch panel mounted thereon and can perform display and touch detection. The optical system 101 including a lens and the distance measuring unit 105 are illustrated in FIG. 2B. The distance measuring unit 105 measures a distance at the same viewing angle as a viewing angle of the optical system 101, for example, in a time-of-flight (ToF) manner.

The display screen illustrated in FIG. 2C is a display screen of a list display application. First to fourth buttons are displayed sequentially from the left in a lower part of the display screen. The first button 201 is a return button for a return operation, the second button 202 is a home button, the third button 203 is a retouch simulation button, and the fourth button 204 is a menu button. These operation buttons are displayed on the touch panel of the display unit 111 and functions associated with the buttons are realized by a user's tapping operation. The return button 201 is a button that is used to return a screen transition state to a previous state. The home button 202 is a button that is used to temporarily stop the list display application and to transition to a home screen. Behavior when a user has tapped the retouch simulation button 203 will be described later. The menu button 204 is a menu starting button that is used to set details of list display.

As illustrated in FIG. 2D, when a user continuously taps the retouch simulation button 203 during a predetermined time or more, a retouch simulation menu 205 is started and an operation area is displayed.

Figure 3:
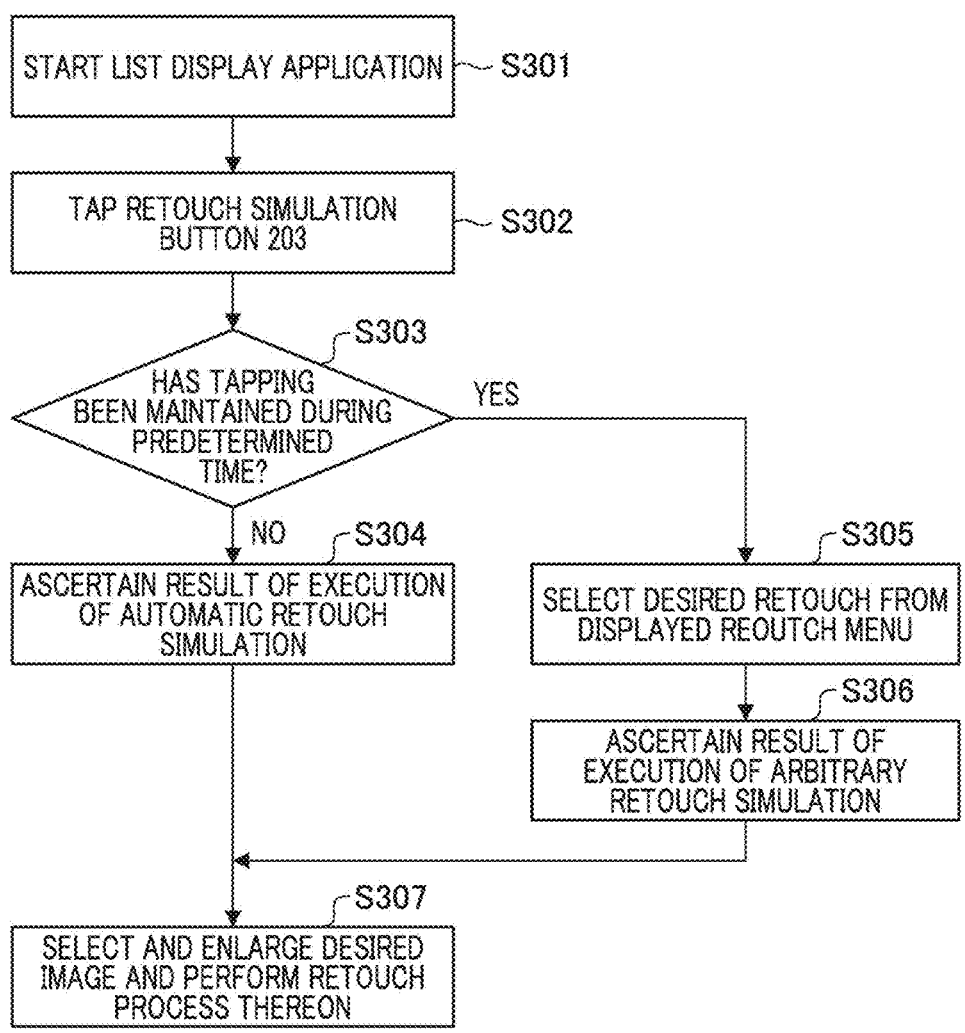
FIG. 3 is a flowchart illustrating a user's operation.

A method of ascertaining retouch effects (image processing effects) of a plurality of images in an image list display application will be described below. FIG. 3 is a flowchart illustrating a user's operation. In S301, a user performs an operation of starting the imaging device 100 and the list display application starts its processing.

In S302, when the user taps the retouch simulation button 203, the routine proceeds to a determination process of S303. In S303, the control unit 108 performs a determination process based on a tapping operation time in S302. The time in which the user's finger touches the display unit 111 is compared with a predetermined time (a threshold time), and the routine proceeds to the process of S304 when short tapping within a predetermined time has been detected. When long tapping in which the time of touch with the display unit 111 is equal to or greater than the predetermined time has been detected, the routine proceeds to the process of S305.

In s304, the control unit 108 performs a process of presenting a result of execution of automatic retouch simulation to the user. The user can ascertain the result of execution on the display screen. Details of the automatic retouch simulation will be described later.

In S305, the display unit 111 displays a screen of the retouch simulation menu 205. The user can select arbitrary retouch simulation from the retouch simulation menu 205.

In S306 subsequent to S305, the control unit 108 performs a process of presenting a result of execution of the selected retouch simulation to the user. The user can ascertain the result of execution of desired retouch simulation on the display screen. Details of the arbitrary retouch simulation will be described later.

After the process of S304 or S306, the routine proceeds to S307. In S307, the control unit 108 receives an image selection instruction through the operation unit 110. When the user selects an image of which details are to be ascertained, the list display application transitions to an image view application. The selected image can be enlarged and displayed and the user can ascertain image quality based on an image processing effect.

Figure 4:
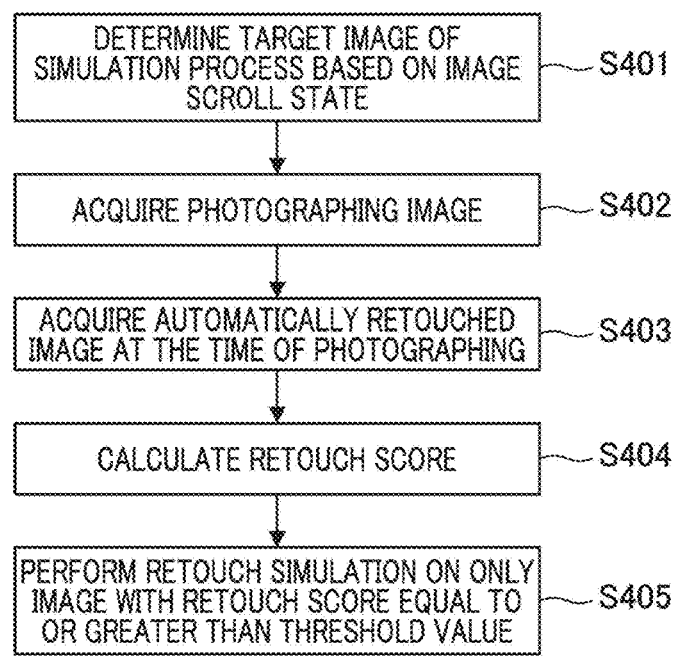
FIG. 4 is a flowchart illustrating an automatic retouch simulation process.

Details of the automatic retouch simulation process (FIG. 3: S304) will be described below with reference to FIG. 4. FIG. 4 is a flowchart illustrating internal processes of the imaging device 100 when an image processing effect automatically determined by the imaging device 100 is ascertained.

First, in S401, the control unit 108 determines a target image of a simulation process based on a scroll state of a screen. That is, a process of selecting an image group to be processed by the retouch simulation is performed. With the image list display function, images can be displayed as long as they can be stored in the recording unit 107. When the retouch simulation process is performed, target images needs to be limited, which is because a process time extends much otherwise. In S401, the following process is performed to avoid a decrease in usability due to an increase in process time.

A scheduled processing image number is defined as n and a setting process thereof is performed. The scheduled processing image number n is set to be greater than the number of images that can be simultaneously displayed in a list on the display unit 111 by the list display application. When the list display application is started in S301 of FIG. 3, an image which is displayed at the first time is defined as an i-th image. A process of selecting the "(i−n/2)-th" to "(i+n/2)-th"

images and setting the selected images as a target image group of the simulation process is performed. Before all images of the target image group of the simulation process transition out of the display screen with the user's scrolling operation, a process of updating the target image group of the simulation process is performed. In the update method, target images (corresponding to the n/2 images) of the simulation process which are far (apart) from the target image of the simulation process displayed on the screen are excluded from the target images. Then, images (corresponding to the n/2 images) in a progress direction of the user's scrolling operation are newly added as target images of the simulation process.

The unit of update is described above to be half the scheduled processing image number n, but an embodiment in which the scheduled processing image number or the unit of update may be arbitrarily set by the user may be employed. The unit of update may be set in consideration of an arrangement of photographing dates or the like. An embodiment in which the update process is controlled based on a scrolling speed may be employed. When the scrolling speed is markedly high and the update operation is sequentially performed, there is a likelihood that the user's operation will be hindered. Therefore, when the user's scrolling speed is greater than a predetermined threshold value, the update process is stopped. When stopping of the user's scrolling operation is detected, a process of setting a first image displayed in a list as an i-th image and determining the target image group of the simulation process is performed.

Then, in S402, a photographing image is acquired. A process of acquiring a photographing image (referred to as Im_org) as each target image of the simulation process is performed. In S403, the control unit 108 performs a process of acquiring an automatically retouched image (referred to as Im_re) recorded at the time of photographing with reference to meta data of each target image of the simulation process. Details of a process of recording an automatically retouched image at the time of photographing will be described later.

In S404 subsequent to S403, the control unit 108 calculates a retouch score which is a determination evaluation value. The retouch score represents a change due to a retouch. When the automatic retouch process is performed, a process of setting the retouch score for an image with a small change from the photographing image to be low and setting the retouch score for an image with a large change from the photographing image to be high is performed.

In a method of calculating the retouch score, a process of quantifying a difference between an automatically retouched image Im_re and the photographing image Im_org is performed. For example, the control unit 108 calculates the difference using a difference absolute value sum. The sum of the absolute values of the differences in pixel values of pixels and color channels between the automatically retouched image Im_re and the photographing image Im_org is calculated as the retouch score.

The method based on the difference absolute value sum has been described above, but a method based on an weighted difference absolute value sum in which weighting of the color channels has been controlled may be employed. In addition to the method of quantifying the difference between the automatically retouched image Im_re and the photographing image Im_org, a method of determining esthetics based on a database in which vast retouch scores are recorded may be employed. A database in which scores are correlated with various retouch results is prepared in advance and a process of comparing the automatically retouched image at the time of photographing with the database is performed. Accordingly, a similar image can be selected and a score correlated with the selected image can be acquired as the retouch score.

In S405 subsequent to S404, the control unit 108 performs retouch simulation on only an image of which the retouch score is equal to or greater than a threshold value. The retouch simulation does not need to be performed on an image with a small change based on a retouch. For example, a gray-out process is performed on an image of which the retouch score calculated in S404 is less than the threshold value.

Retouch simulation is performed on an image of which the retouch score calculated in S404 is equal to or greater than the threshold value using the following method. The retouch simulation is realized by displaying an image changing with time which is generated using the photographing image Im_org acquired in S402 and the automatically retouched image Im_re acquired in S403. This image is referred to as a retouch simulation moving image and is defined as M_sim. The retouch simulation moving image M_sim is generated using (Expression 1).

$$M\_sim = \alpha t * Im\_org + (1 - \alpha t) * Im\_re \quad \text{(Expression 1)}$$

The coefficient $\alpha t$ in (Expression 1) indicates a weighting factor for weighting and synthesis. The value of $\alpha t$ is a real number in a range of 0 to 1 and is a value changing with a reproduction time. That is, the photographing image Im_org and the automatically retouched image Im_re are weighted using the coefficient at and are synthesized. When an image size of the photographing image Im_org and an image size of the automatically retouched image Im_re are different from each other, a resizing process of arranging the image sizes is performed in advance.

Figure 5A:
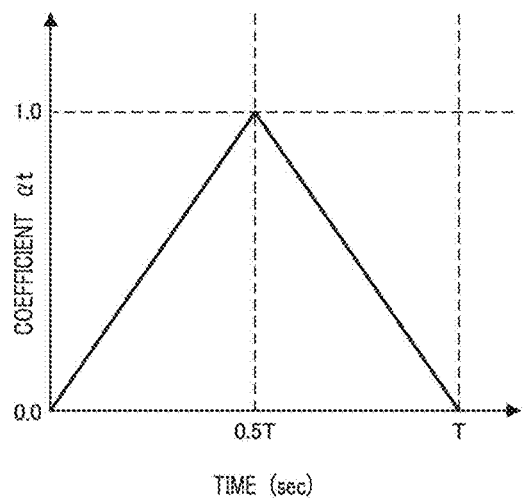
FIGS. 5A and 5B are diagrams illustrating a change of a coefficient with the elapse of time in automatic retouch simulation.
Figure 5B:
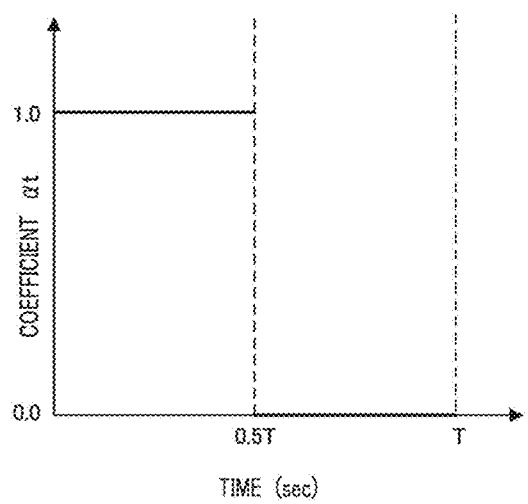

A change of the value of the coefficient at with time will be described below with reference to FIGS. 5A and 5B. FIG. 5A illustrates an example in which the value of the coefficient at changes linearly with the elapse of time and FIG. 5B illustrates an example in which the value of the coefficient at changes discontinuously. The horizontal axis is a time axis and T indicates a length of one cycle of a change with time. The vertical axis represents the value of the coefficient at from zero to the time T in a range of 0 to 1.

In the graph illustrated in FIG. 5A, the value of the coefficient $\alpha t$ changes with time and the value of the coefficient $\alpha t$ increases linearly with the elapse of time in a period from zero to 0.5 T (sec). At 0.5 T (sec), the value of the coefficient $\alpha t$ reaches 1 which is a maximum value, then decreases linearly with the elapse of time, and returns to zero after T (sec). A state in which the photographing image changes continuously to a retouched image can be expressed as a retouch simulation moving image M_sim using the characteristics illustrated in FIG. 5A.

In the graph illustrated in FIG. 5B, the value of the coefficient $\alpha t$ changes to 0 which is a minimum value or 1 which is a maximum value with time. The value of the coefficient $\alpha t$ is 1 which is the maximum value in the period from 0 (sec) to 0.5 T (sec), and the value of the coefficient $\alpha t$ is 0 which is the minimum value in the period from 0.5 T (sec) to T (sec). A state in which the image is sequentially switched between before and after being retouched with time can be expressed as a retouch simulation moving image M_sim using the characteristics illustrated in FIG. 5B.

The retouch simulation moving image M_sim is repeatedly reproduced with time using T associated with a change of the value of the coefficient αt as one cycle. The length T of one cycle can be arbitrarily changed by the user using the menu button 204.

By displaying the generated retouch simulation moving image M_sim as a thumbnail image in a list, the user can ascertain image processing effects of a plurality of images. An example in which the retouch score is calculated at the time of ascertainment of the retouch simulation in the list display application has been described above. The present invention is not limited thereto and the retouch score may be calculated when automatic retouch is performed at the time of photographing.

A process of generating an automatically retouched image at the time of photographing will be described below with reference to the flowchart illustrated in FIG. 6. In S601, the control unit 108 determines a retouch method by analyzing current photographing conditions and an image which is being displayed in a live view. The display in a live view is sequentially displaying photographing images acquired before a recording image is captured. The process of determining the retouch method will be described later with reference to FIG. 7.

Figure 9:
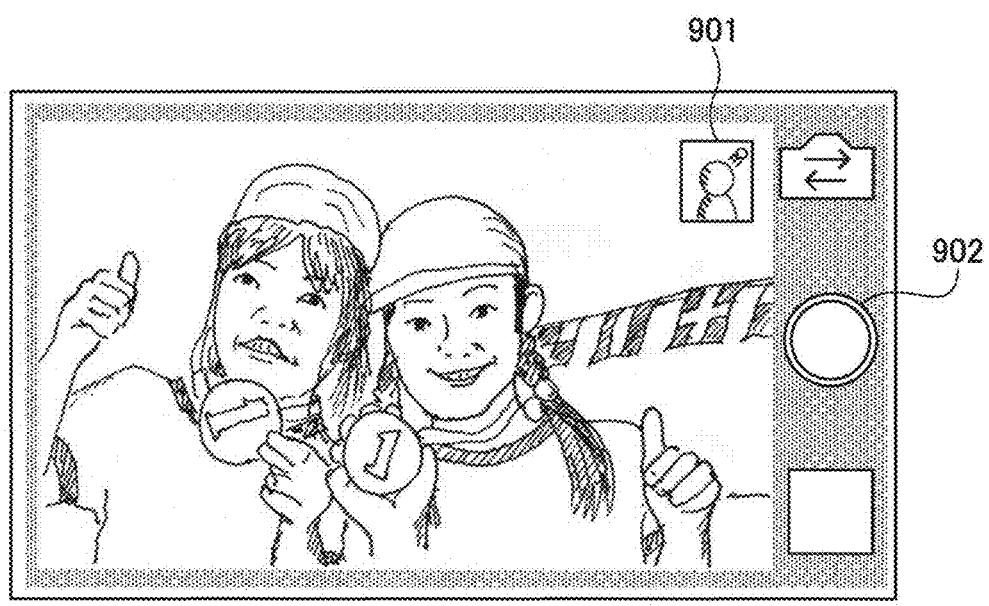
FIG. 9 is a diagram illustrating an example of a screen on a display unit at the time of photographing.

In S602, the control unit 108 performs a process of notifying the user what automatic retouch process has been selected. An example of the notification process will be described later with reference to FIG. 9. Then, in S603, the control unit 108 performs a process of capturing a recording image by interlocking with tapping of a release button (FIG. 9: 902). In S604, the image processing unit 104 and the control unit 108 perform a retouch process based on the retouch method selected in S601. At this time, the retouch process may be performed on an image obtained by reducing the recording image in view of an increase in process speed and a decrease in recording volume.

In S605, the recording unit 107 and the control unit 108 record data of the retouched image processed in S604 as meta information of the image captured in S603, that is, the acquired image (recording image).

The process of determining the retouch method will be described below with reference to FIG. 7. FIG. 7 is a flowchart illustrating the process of determining the retouch method. In FIG. 7, a determination process of selecting one of three types of image processing methods described below as candidates for the retouch method is performed:

(1) A relighting process of irradiating a subject with light of a virtual light source;
(2) A background blurring process of reproducing an image with a small depth of field by separating a foreground and a background and blurring a background area; and
(3) An art filter process of changing a feel of an image as a whole.

First, in S701, the control unit 108 performs a process of capturing an image through imaging of a live view by controlling the imaging element 102 or the like. Then, in S702, the distance measuring unit 105 is started and the control unit 108 determines whether a photographing mode in which distance information from the imaging device 100 to a subject can be acquired is set. The routine proceeds to the process of S703 when it is determined that distance information of a subject can be acquired, and the routine proceeds to S708 when it is determined that distance information of a subject cannot be acquired.

In S703, the control unit 108 determines whether the captured image acquired in S701 can be separated into a foreground and a background. In this determination method, for example, a process of assigning the distance information acquired in S703 to pixels of the captured image acquired in S701 is performed. A process of generating a histogram of the distance information of the pixels is performed, and the control unit 108 ascertains bimodality of the generated histogram. Bimodality is determined based on a frequency peak of the histogram. When bimodality has been ascertained, the control unit 108 determines that a background set and a foreground set can be separated. Bimodality of the histogram can be ascertained using a method known as Silverman's verification as the method of ascertaining bimodality of the histogram. The routine proceeds to the process of S704 when bimodality of the histogram could be ascertained, that is, when it is determined that a foreground and a background can be separated, and the routine proceeds to the process of S708 when it is determined that a foreground and a background cannot be separated.

In S704, a process of separating a foreground area and a background area of the captured image acquired in S701 is performed. For example, a discriminant analysis method (a method known as Otsu's binarization) may be used as a method of separating the areas. In this method, a threshold value at which the value of a degree of separation is maximized can be calculated and binarization can be automatically performed. After the process of binarizing the histogram of the distance information calculated in S703 has been performed, a process of setting a set of small distance information as a foreground and setting a set of large distance information as a background is performed.

In S705, the control unit 108 determines whether a 3D shape of a foreground subject separated in S704 can be acquired. A process of acquiring a 3D shape can be realized by performing fitting with reference to 3D shapes of various subjects recorded by the recording unit 107 (with reference to shape data). Here, it is assumed that a foreground subject is a person. The face detecting unit 106 detects a face area from the foreground subject. Fitting is performed such that an error between distance information corresponding to the detected face area and 3D information of a face acquired from the recording unit 107 is minimized. At this time, the error value is compared with a threshold value. When the error value is less than the threshold value, that is, when it is determined that a 3D shape of the foreground subject can be acquired, the routine proceeds to the process of S706. When the error value is equal to or greater than the threshold value, the routine proceeds to the process of S707.

In S706, the control unit 108 selects the relighting process. The relighting process will be described later with reference to FIG. 8. In S707, the control unit 108 selects the background blurring process. The background blurring process is performed by performing a low-pass filter process on the background area separated in S704 and synthesizing the processed image with the foreground image. For example, a mean filter is used for the low-pass filter process, but a filter that reproduces blurring characteristics of a lens may be used.

In S708, the control unit 108 selects the art filter process. The art filter process is, for example, a process of changing an impression of an image by sepia-toning the image or emphasizing a saturation thereof. The art filter process is known and thus description thereof will be omitted. In S708, one art filter process based on information recorded in the recording unit 107 is performed. For example, a process of selecting an art filter process with a highest use frequency by a user is performed.

Figure 8:
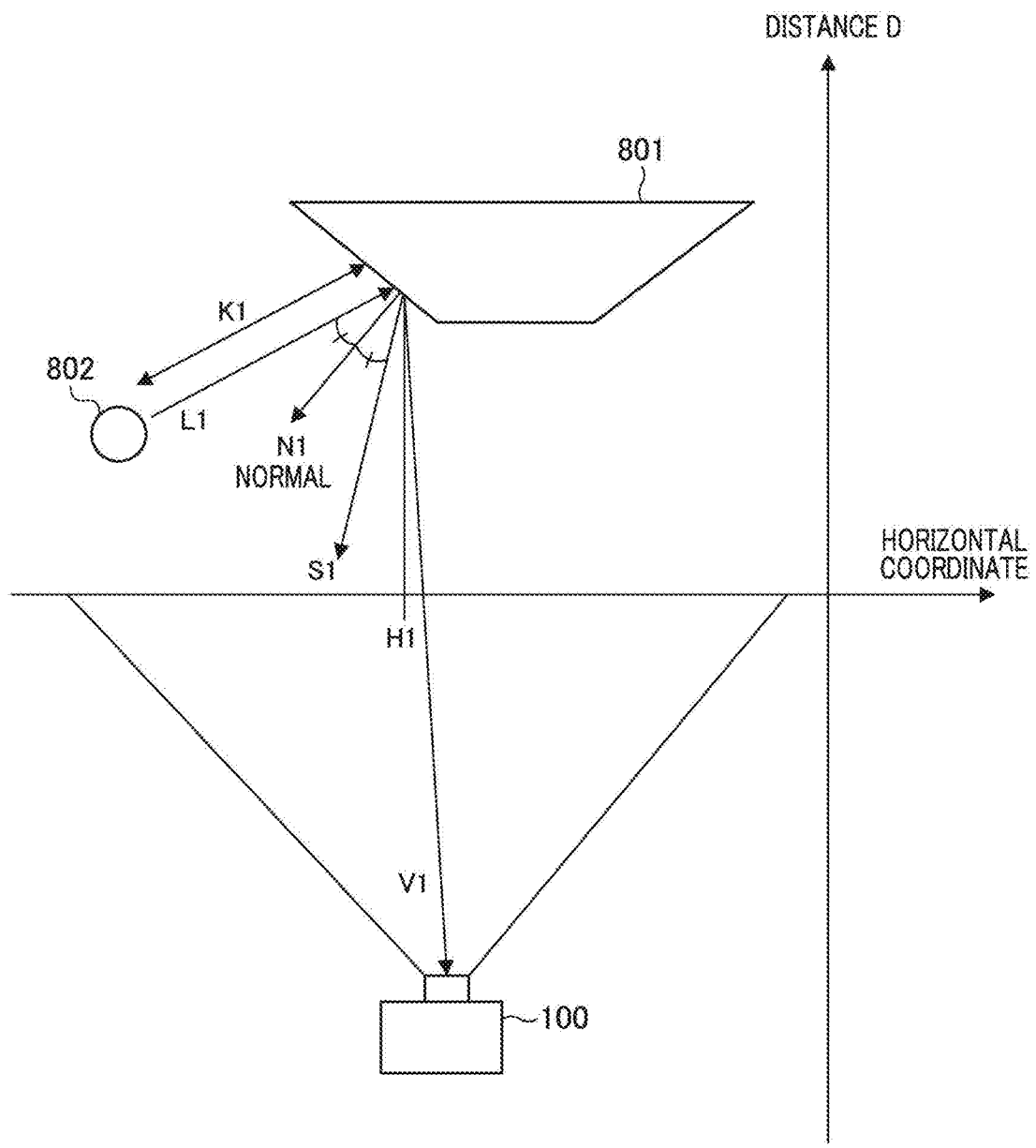
FIG. 8 is a diagram schematically illustrating calculation of a reflective component in a relighting process.

FIG. 8 is a diagram schematically illustrating calculation of a reflective component in the relighting process. A positional relationship between the imaging device 100 and a subject 801 and a virtual light source 802 at the time of photographing and reflection characteristics of the virtual light source are illustrated. An axis in a right-left direction of FIG. 8 is defined as a horizontal coordinate axis and an axis in a vertical direction perpendicular thereto is defined as an axis in a depth direction (an axis of depth information indicating a distance D). A vertical pixel position on an axis in a direction perpendicular to the drawing surface of FIG. 8 will not be described for the purpose of simplification of description.

The subject 801 illustrated in FIG. 8 is a foreground subject separated in S704 in FIG. 7. The relighting process is realized by adding diffuse reflective components Rd, Gd, and Bd from the virtual light source 802 set at a predetermined position to color signals R, G, and B of an input image. In the process of calculating the diffuse reflective components Rd, Gd, and Bd, a horizontal pixel position of an image captured by the imaging device 100 is defined as H1. A normal vector at the horizontal pixel position H1 of the subject 801 is defined as N1, and a direction vector of a light beam from the virtual light source 802 to a subject position (an intersection position of the normal vector N1 and the subject 801) is defined as L1. A distance between the virtual light source 802 and the subject position is defined as K1. A direction vector of reflected light at the subject position is defined as SI, and a direction vector from the subject position to the imaging device 100 is defined as V1.

A diffuse reflective component at the horizontal pixel position H1 has a value which is proportional to an inner product of the normal vector N1 at the horizontal pixel position H1 and the direction vector L1 and is inversely proportional to a square of the distance K1 between the virtual light source 802 and the subject position. A diffuse reflective component intensity based on the virtual light source 802 is defined as Pd. Pd can be expressed as (Expression 2) and the diffuse reflective components Rd, Gd, and Bd of colors can be expressed as (Expression 3).

(Expression 2)

$$Pd = \sum_{Lights} \left\{ \alpha \times k_d \times \frac{-L \cdot N}{K^2} \right\} \quad \text{(Formula 2)}$$

(Expression 3)

$$Rd = Pd \times Rw \times R \quad \text{(Formula 3)}$$
$$Gd = Pd \times Gw \times G$$
$$Bd = Pd \times Bw \times B$$

N in (Expression 2) is a three-dimensional normal vector of the subject and K is a distance between the virtual light source and the subject. kd is a diffuse reflectance of the subject. α indicates an intensity of the virtual light source and L is a three-dimensional direction vector of the virtual light source. R, G, and B in (Expression 3) are color signals of pixels in the foreground area separated in S703. Rw, Gw, and Bw are parameters indicating colors of the virtual light source.

The calculated diffuse reflective components Rd, Gd, and Bd are added to the color signals R, G, and B of the input image, respectively. As expressed by (Expression 4), color signals R_out, G_out, and B_out on which the relighting process has been performed are generated.

$$R_{\_out} = R + Rd$$
$$G_{\_out} = G + Gd$$
$$B_{\_out} = B + Bd \quad \text{(Formula 4)}$$

(Expression 4)

FIG. 9 is a diagram illustrating a screen example of the display unit 111 at the time of photographing in this embodiment. An example in which an icon 901 and a release button 902 are displayed on the screen is illustrated. The icon 901 indicates the retouch method (for example, the relighting process) selected in S601 in FIG. 6. By displaying the retouch method using the icon 901, the user can easily recognize the retouch method. A notification example using an icon has been described, but notification using display of text or the like may be employed.

Figure 10:
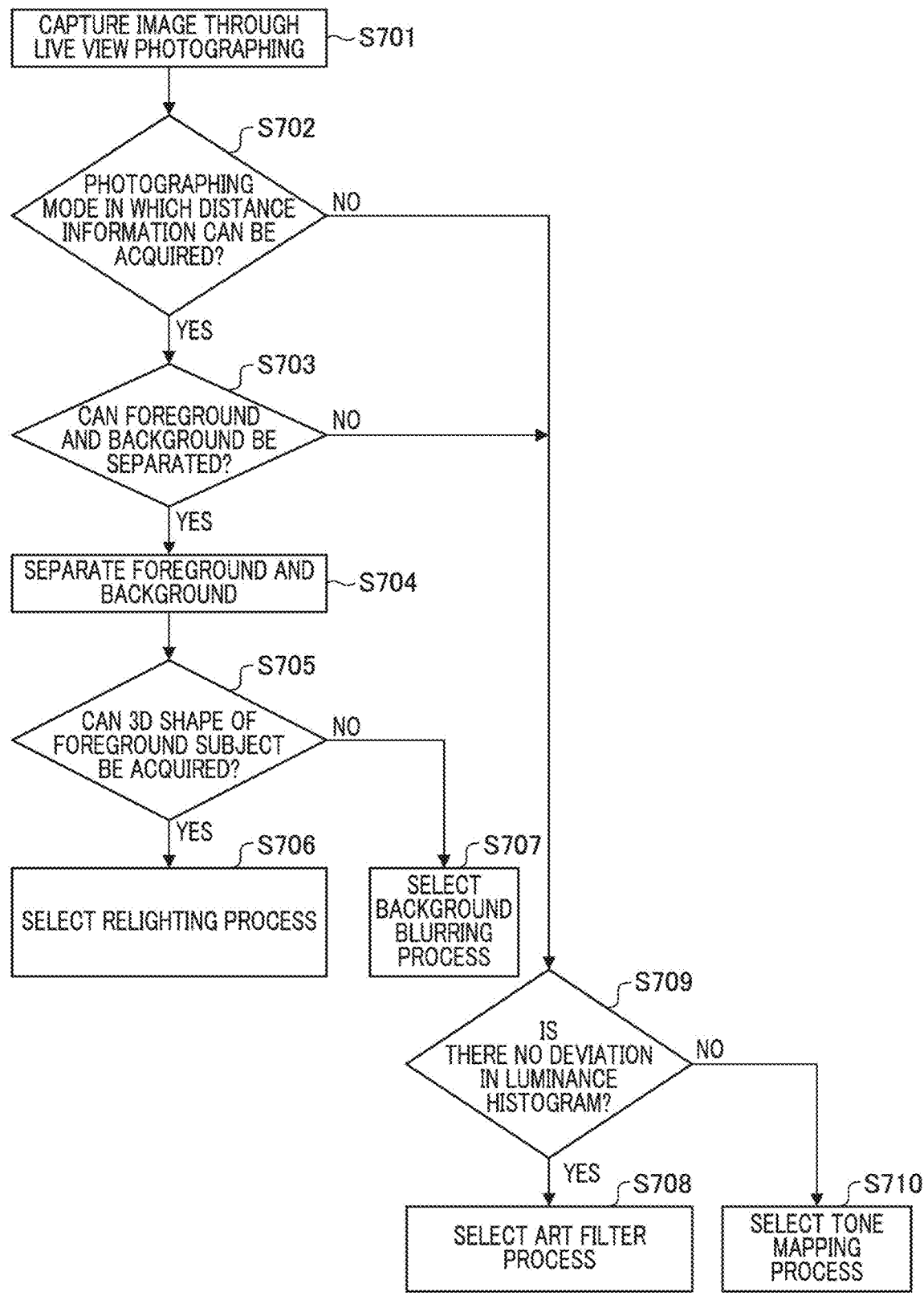
FIG. 10 is a flowchart illustrating another example of the process routine of automatically selecting a retouch method.

Three types of retouch methods have been described above with reference to FIG. 7, but a method of applying another image processing effect may be added. FIG. 10 is a flowchart illustrating an example in which a retouch method (an image processing method) using a tone mapping process is added. FIG. 10 is different from FIG. 7 in that S709 and S710 are added, and only the different processes will be described below.

When the determination condition of S702 is not satisfied or when the determination condition of S703 is not satisfied, the routine proceeds to the process of S709. S709 is a process of determining whether it is appropriate to perform the tone mapping process. For example, a method of calculating a luminance histogram of a captured image and determining a deviation of the histogram is used as the determination method. When a deviation of the histogram is determined, the control unit 108 compares a variance of the histogram with a predetermined threshold value. When it is determined that the variance of the histogram is equal to or less than the threshold value, the routine proceeds to the process of S708. When it is determined that the variance of the histogram is greater than the threshold value, that is, there is a deviation of the histogram, the routine proceeds to the process of S710. In S710, the tone mapping process is performed such that the variance of the histogram reaches a predetermined value. The tone mapping process is known and thus description thereof will be omitted.

As described above, in the embodiment in which another retouch process is added, the control unit 108 determines whether it is appropriate to perform the added retouch process. That is, one of various types of retouch processes can be selected by adding the process of selecting and determining the retouch process to the flowchart.

Figure 11:
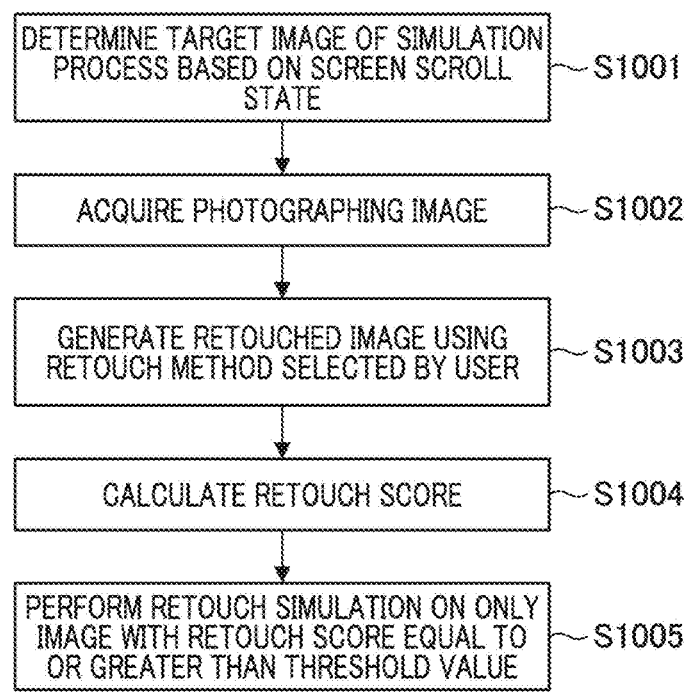
FIG. 11 is a flowchart illustrating an arbitrary retouch simulation process which is designated by a user.

Arbitrary retouch simulation which is designated by a user in S306 in FIG. 3 will be described below in detail with reference to FIG. 11. FIG. 11 is a flowchart illustrating an internal process routine of the imaging device 100 when an arbitrary image processing effect designated by a user is ascertained. Since the processes of S1001, S1002, S1004, and S1005 in FIG. 11 correspond to S401, S402, S404, and S405 in FIG. 4, description thereof will be omitted and the process of S1003 will be described.

In S1003, a process of generating a retouched image based on the retouch method selected by the user in S305 in FIG. 3 is performed. For example, a process example when the user selects the relighting process will be described.

In the relighting process, all the conditions of S702, S703, and S705 described above with reference to FIG. 7 need to be satisfied. That is, executable conditions thereof include the condition that an image is captured in the photographing mode in which distance information can be acquired, the condition that a foreground and a background can be separated, and the condition that a 3D shape of a foreground subject can be acquired. Accordingly, the control unit 108 selects an image satisfying the executable conditions from the processing target images determined in S1001. The relighting process is performed on only the selected image. A gray-out process is performed on the non-selected images of the processing target images at the time of display of a list such that the user can recognize that they have not been processed.

An example in which a user selects the relighting process has been described above, but the user can select another image processing method. In this case, when it is determined that a condition that a retouch of an image is not possible is satisfied, a process of notifying the user that a retouch process could not be performed on the image using an icon, a message, or the like is performed at the time of display of a list.

A process routine when a user ascertains a retouched image in detail using an image viewing application in S307 in FIG. 3 will be described below. The retouched image generated in S604 in FIG. 6 or in S1003 in FIG. 11 is an image which is generated in a relatively small image size for the purpose of display of a list. Accordingly, such a retouched image is not appropriate for ascertainment in an image viewer. Therefore, a retouch process is performed again in an image size equivalent to a recording image at the time of photographing when the image viewer is started.

When the retouch process is performed again, a retouch strength is not limited to a retouch strength equivalent to that of an automatic retouch at the time of photographing. A retouch simulation moving image changes with the time axis which is represented by the horizontal axis in FIGS. 5A and 5B, and a process of changing a strength of a re-retouch process (image processing) when the image viewer is started is performed based on a time value of an instance at which a user has performed tapping. For example, when a user performs a tapping operation on an image retouched through the relighting process, it is assumed that the user has performed tapping with a time (T/2) of a half period of retouch simulation which is periodically repeated. In this case, an image on which the relighting process has been performed in a state in which the strength parameter (coefficient $\alpha$) in (Expression 2) is replaced with $\alpha/2$ is generated.

In this embodiment, a user can simply ascertain image processing effects based on a plurality of image processing methods by displaying thumbnails of a retouch simulation moving image in the image list display application. According to this embodiment, it is possible to provide an imaging device that can reduce a user's operation burden at the time of photographing and easily ascertain image processing effects of a plurality of images when a user ascertains the images in the list display application.

Other Embodiments

An embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-195762, filed Nov. 26, 2020, which is hereby incorporated by reference wherein in its entirety.

What is claimed is:

1. An image processing device comprising:
   at least one processor; and
   at least one memory holding a program that makes the processor function as:
   a selection unit configured to select an image out of a plurality of images displayed in a list;
   a generation unit configured to generate a second image by performing image processing on a first image selected by the selection unit and to generate a third image used for displaying a list as a moving image sequentially switching with time out of the first and second images;
   a control unit configured to control the generation unit;
   an output unit configured to output the third image, and
   a display unit configured to display the list using the third image which is generated using an image processing method determined by the control unit,
   wherein the generation unit generates a moving image sequentially switching from the first image to the second image with time or a moving image sequentially switching from the second image to the first image with time as the third image,
   wherein the control unit performs control such that an evaluation value for determination is calculated with respect to the image processing performed on the first image and the third image is generated by the generation unit when the evaluation value is equal to or greater than a threshold value.

2. The image processing device according to claim 1, wherein the control unit notifies the generation unit of a method selected from a plurality of image processing methods based on imaging conditions or subject conditions of a captured image.

3. The image processing device according to claim 2, wherein the processor further functions as an acquisition unit configured to acquire distance information of a subject, and
   wherein the control unit performs a process of determining an image processing method for the first image by determining distance information of the subject, information of a subject in a foreground and a background based on the distance information, or a 3D shape of a subject in the foreground.

4. The image processing device according to claim 1, wherein the control unit performs a process of automatically selecting an image processing method or selecting an imaging processing method corresponding to an operation received in the displayed list of images.

5. The image processing device according to claim 4, wherein the control unit performs a process of notifying of the determined image processing method.

6. The image processing device according to claim 1, wherein the control unit performs control such that the third image is displayed in a period which is preset by the display unit.

7. The image processing device according to claim 1, wherein the display unit is able to enlarge and display the image selected by the selection unit, and
wherein the control unit performs a process of changing a strength of image processing in the generation unit based on a time value at which the image is selected.

8. An imaging device comprising:
at least one processor; and
at least one memory holding a program that makes the processor function as:
an imaging unit configured to acquire an image;
a selection unit configured to select an image out of a plurality of images displayed in a list;
a generation unit configured to generate a second image by performing image processing on a first image selected by the selection unit and to generate a third image used for displaying a list as a moving image sequentially switching with time out of the first and second images;
a control unit configured to control the generation unit;
an output unit configured to output the third image, and
a display unit configured to display the list using the third image which is generated using an image processing method determined by the control unit,
wherein the generation unit generates the moving image sequentially switching from the first image to the second image with time or the moving image sequentially switching from the second image to the first image with time as the third image,
wherein the control unit performs control such that an evaluation value for determination is calculated with respect to the image processing performed on the first image and the third image is generated by the generation unit when the evaluation value is equal to or greater than a threshold value.

9. The imaging device according to claim 8, wherein the control unit performs a process of determining an image processing method corresponding to an operation received at the time of imaging or in the displayed list and controls display of the list based on the third image generated using the determined image processing method.

10. The imaging device according to claim 8, wherein the processor further functions as a recording unit configured to record the first and second images on a recording medium, and
wherein the control unit performs control such that information of the second image is recorded as meta information for information of the first image by the recording unit.

11. A control method that is performed by an image processing device capable of outputting an image used for displaying a list, the control method comprising:
selecting an image out of a plurality of images displayed in the list;
generating a second image by performing image processing on a first image selected in the selecting and generating a third image used for displaying the list as a moving image sequentially switching with time out of the first and second images;
outputting the third image; and
displaying the list using the third image which is generated using an image processing method,
wherein the image processing device generates the moving image sequentially switching from the first image to the second image with time or the moving image sequentially switching from the second image to the first image with time as the third image,
wherein the image processing device performs control such that an evaluation value for determination is calculated with respect to the image processing performed on the first image and the third image is generated by the generating when the evaluation value is equal to or greater than a threshold value.

12. A non-transitory recording medium storing a control program of an image processing device causing a computer to perform each step of a control method of the image processing device, the control method being performed by an image processing device capable of outputting an image used for displaying a list, the control method comprising:
selecting an image out of a plurality of images displayed in the list;
generating a second image by performing image processing on a first image selected in the selecting and generating a third image used for displaying the list as a moving image sequentially switching with time out of the first and second images; and
outputting the third image; and
displaying the list using the third image which is generated using an image processing method,
wherein the image processing device generates the moving image sequentially switching from the first image to the second image with time or the moving image sequentially switching from the second image to the first image with time as the third image,
wherein the image processing device performs control such that an evaluation value for determination is calculated with respect to the image processing performed on the first image and the third image is generated by the generating when the evaluation value is equal to or greater than a threshold value.

* * * * *